United States Patent Office 3,150,056
Patented Sept. 22, 1964

3,150,056
NUCLEAR REACTOR FUEL ELEMENTS
Kenneth Henry Dent, Cuddington, Northwich, and William Charles Leonard Kent, Timperly, England, assignors to United Kingdom Atomic Energy Authority, London, England
Filed Mar. 2, 1961, Ser. No. 92,936
Claims priority, application Great Britain Oct. 10, 1960
6 Claims. (Cl. 176—77)

This invention relates to nuclear reactor fuel elements and is concerned with nuclear fuel elements of elongate form equipped with end terminations for location within a fuel element coolant channel of a nuclear reactor.

One form of end termination comprises three radially projecting arms extending towards the walls of the fuel element coolant channel, the ends of the arms having clearance with the channel so as to allow unhindered charging and discharging of the fuel elements and to allow for a certain amount of distortion in the fuel elements produced by irradiation and thermal cycling. It is found that fuel elements so equipped are not stable under certain conditions of coolant flow and vibrations are created which can damage the elements.

It is therefore an object of the invention to provide a nuclear reactor fuel element of elongate form equipped with an end termination providing a stabilising influence on the element.

According to the invention, a nuclear reactor fuel element of elongate form equipped with an end termination comprising three radially projecting arms, is characterised in that two of the arms are of fixed length and the third radially extensible so that a lateral force can be applied to the fuel element at the end termination.

Preferably the effective length of the arms of fixed length is equal to the radius of the fuel element coolant channel in which the fuel element is used so that the fuel element is located in the centre of the channel as, in this position, it is found that it is subjected to low unstabilising forces.

Figure 1:
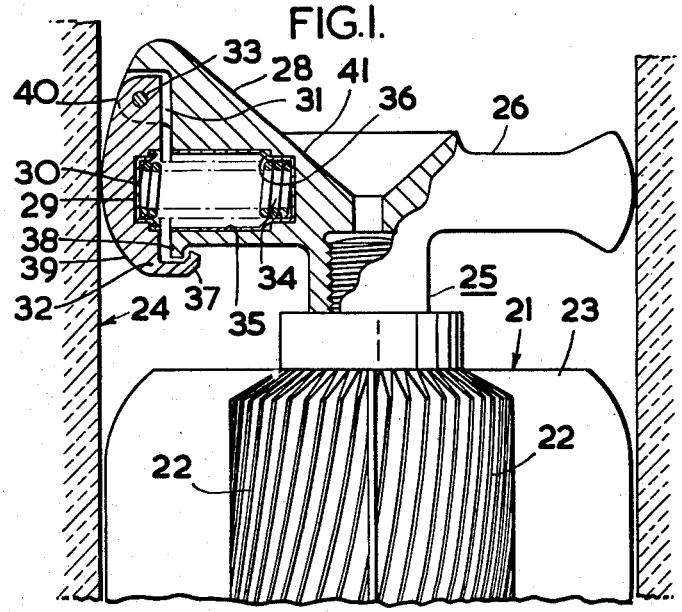
Figure 2:
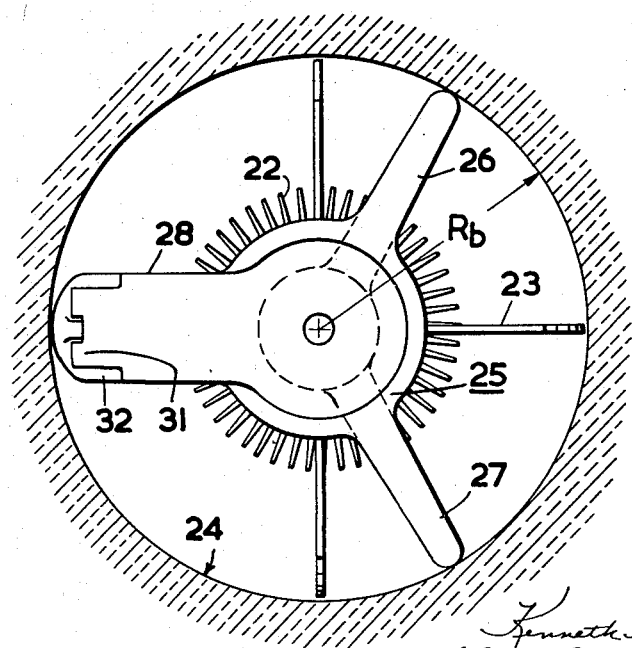

An embodiment of the invention will now be described by way of example with reference to the accompanying drawings wherein:

FIGURE 1 is a fragmentary side view, partly in section, of the upper end portion of a nuclear reactor fuel element in a fuel element coolant channel, and FIGURE 2 is a plan view thereof.

Referring to the drawings, a fuel element 21 of elongate form having helical heat transfer fins 22 and four equispaced longitudinal flow splitters 23 is disposed in a vertical fuel element coolant channel 24 of a gas-cooled, graphite moderated nuclear reactor in which refuelling is performed from the top face of the moderator. The upper end of the fuel element 21 is equipped with an end termination 25 comprising three radially projecting arms 26, 27, 28, arms 26, 27 being of effective radial length $Rb$ corresponding to the radius of the coolant channel 24 and arm 28 being radially extensible by virtue of a part in the form of a lever 32 movable about the axis of a lateral pin 33 mounted in a forked part 31 of the arm 28. Movement of the lever 32 is influenced by a spring 34 located in hollow portions 29, 35 of the lever 32 and arm 28 respectively.

The end termination 25 has a cup-like portion 41 to accommodate a cone member carried on the lower end of another fuel element so that a series of fuel elements can be stacked one upon the other in the coolant channel 24.

The hollow portions 29, 35 are lined with zirconium cups 30, 36 respectively to avoid contact between the spring 34 and the walls of the hollow portions 29, 35. The spring 34 is of "Nimonic 80a" (a nickel-base alloy) and the arm 28 and lever 32 are of "Magnox" (a megnesium-base alloy), the zirconium cups 30, 36 preventing contact between these materials and thereby avoiding a compatibility problem. The lever 32 has a catch 37 behind a lip 38 so that the lever 32 cannot move outwardly beyond a predetermined limit, thereby avoiding fouling of the channel opening or charging of the element thereinto. The lever 32 has lead-in and lead-out surfaces 39, 40 and the extremities of the arms 26, 27 also have lead-in and lead-out surfaces so as to avoid jamming of the fuel element during refuelling. The arms 26, 27 are held against the walls of the channel 24 by the loading of the spring 34. The lever 32 may if desired be held against the loading of the spring 34 during refuelling by a suitable fitting on the refuelling grab employed to raise and lower the fuel element during discharging and charging respectively. Upon release of the grab, the lever 32 moves outwardly against the wall of the channel 24. The fuel element 21 is located centrally by the arms 26, 27 when the spring loaded lever 32 contacts the channel wall so as to ensure that the unstabilising forces are low, with the result that the spring pressure can readily hold the upper end of the fuel element against lateral vibration. The lower end of the fuel element is stabilised by location with the stabilised upper end of the next lower element, and so on.

We claim:

1. A nuclear reactor fuel element of elongate form having an end termination member secured to one end thereof; three radially projecting arms on said end termination member, two of said arms being fixed and of fixed effective radial length, the third arm having a part pivoted thereto; a compression spring extending between said pivoted part and the fixed body of said third arm and tending to move said part so as to extend the effective radial length of said third arm, whereby a lateral force can be applied to center the fuel element at the end termination when the said part contacts the wall of a nuclear reactor fuel element channel in which the fuel element may be disposed; a catch on the pivoted part of the third arm, and a lip on the fixed body of the third arm, the catch being lodged behind the lip so as to limit the movement of said part in the radial length-extending direction.

2. A nuclear reactor fuel element of elongate form having an end termination member secured to one end thereof, three radially projecting arms on said end termination member, two of said arms being fixed and of fixed effective radial length, the third arm having a part pivoted thereto, and resilient means tending to move said part so as to extend the effective radial length of said arm, whereby a lateral force can be applied to center the fuel element at the end termination when the said part contacts the wall of a nuclear reactor fuel element channel in which the fuel element may be disposed, said third arm having a forked portion in between the arms of which said part is pivoted, said resilient means comprising a compression spring extending between said part and the fixed body of said third arm, the pivoted part of the third arm having a catch and the fixed body of the third arm having a lip, said catch being lodged behind said lip so as to limit the movement of said part in the radial length-extending direction.

3. A nuclear reactor fuel element according to claim 2 wherein said arms of fixed length each have a radial length equivalent to the radius of the fuel element channel in which the fuel element is to be disposed.

4. A nuclear reactor fuel element according to claim 2 wherein recesses are provided in said part and said fixed body of said third arm for locating the ends of said spring.

5. A nuclear reactor fuel element according to claim 2 wherein said part and the ends of said arms of fixed length are each provided with lead-in and lead-out surfaces.

6. A nuclear reactor fuel element according to claim 2 wherein said end termination member is provided with means for locating the end of an adjacent fuel element.

References Cited in the file of this patent

UNITED STATES PATENTS

| | | |
|---|---|---|
| 711,966 | Hendrick | Oct. 28, 1902 |
| 2,885,335 | Moore et al. | May 5, 1959 |
| 2,949,415 | Stubbs et al. | Aug. 16, 1960 |
| 2,983,662 | Shillitto et al. | May 9, 1961 |

FOREIGN PATENTS

| | | |
|---|---|---|
| 213,799 | Australia | Mar. 6, 1958 |
| 563,703 | Belgium | July 3, 1958 |
| 1,063,290 | Germany | Aug. 13, 1959 |
| 1,223,823 | France | Feb. 1, 1960 |
| 875,462 | Great Britain | Aug. 23, 1961 |